(12) United States Patent
Cui et al.

(10) Patent No.: US 8,405,889 B2
(45) Date of Patent: Mar. 26, 2013

(54) RAISABLE SCAN HEAD FOR AN IMAGING APPARATUS

(75) Inventors: Chengwu Cui, Lexington, KY (US); Charles Brandon Langrel, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 389 days.

(21) Appl. No.: 12/790,392

(22) Filed: May 28, 2010

(65) Prior Publication Data

US 2011/0292473 A1 Dec. 1, 2011

(51) Int. Cl.
*H04N 1/04* (2006.01)
(52) U.S. Cl. ......... 358/496; 358/498; 358/483; 358/408
(58) Field of Classification Search .................. 358/496, 358/498, 483, 408
See application file for complete search history.

(56) References Cited

U.S. PATENT DOCUMENTS

| 7,973,985 | B2* | 7/2011 | Tan et al. | 358/496 |
| 2002/0105686 | A1* | 8/2002 | Hasegawa et al. | 358/498 |
| 2004/0008386 | A1* | 1/2004 | Shiraishi | 358/474 |
| 2005/0213167 | A1* | 9/2005 | Shiraishi | 358/474 |

* cited by examiner

*Primary Examiner* — Houshang Safaipour
(74) *Attorney, Agent, or Firm* — John Victor Pezdek

(57) ABSTRACT

An imaging apparatus includes an automatic document feeder having a media feeding section, a media collecting section and a media conveying path extending from the media feeding section to the media collecting section. The imaging apparatus includes a scan head adjacent to the automatic document feeder. The scan head is moveable to a raised position aligned with a portion of the media conveying path for scanning a media sheet in the portion of the media conveying path.

19 Claims, 8 Drawing Sheets

RAISABLE SCAN HEAD FOR AN IMAGING APPARATUS

BACKGROUND

1. Field of the Invention

The present invention relates generally to an imaging apparatus and particularly to an imaging apparatus having a scan head that is raisable to a position for scanning a media sheet in the media conveying path of an automatic document feeder (ADF).

2. Description of the Related Art

An imaging apparatus, such as a copier, scanner, or a multifunction printing device (MFP) may include a scanning mechanism that operates in an ADF mode and/or a manual mode. A media sheet, such as paper or a transparency, when placed in an ADF or on a flatbed, is scanned by the imaging apparatus.

FIG. 1 shows an existing imaging apparatus 10 that includes an ADF 12, an imaging surface 14 and an imaging surface 16. The imaging apparatus 10 works in two modes, ADF mode and manual mode. In manual mode, each media sheet is manually placed on the imaging surface 16 where the scanning operation takes place. Below the imaging surface 16, a scan head (not shown) moves laterally in order to scan the media sheet. After the media sheet is scanned by the imaging apparatus 10, the media sheet must be manually removed from the imaging surface 16 prior to placing a second media sheet on the imaging surface 16 for scanning.

In ADF mode, manual feeding and removal of the media sheet is not required. The media sheet or a stack of media sheets are placed in a media feeding section 18. Each media sheet is then automatically sequentially fed by the ADF 12 through a portion of the imaging apparatus 10 for scanning. When scanning the media sheet is complete, the scanned media sheet is automatically driven out of the imaging apparatus 10 to a media collecting section 20. While scanning in ADF mode, the scan head generally does not move. Rather, the scan head is positioned beneath the imaging surface 14 for scanning the media thereon. The media sheet travels from the media feeding section 18 over the imaging surface 14 to the media collecting section 20. An ADF ramp 22 is disposed adjacent to the imaging surface 14. The ADF ramp 22 guides the media sheet towards the media collecting section 20 as the media sheet passes through the ADF.

FIGS. 2 and 3 show the media path of the ADF of the above-described imaging apparatus 10. A plurality of conveyors 24 are shown for transferring the media sheet from the media feeding section 18 to the media collecting section 20. While travelling from the media feeding section 18 to the media collecting section 20, the media sheet passes over the imaging surface 14, at which point a scan head 26 positioned beneath the imaging surface 14 scans the sheet. ADF ramp 22 guides the media sheet towards the media collecting section 20.

As shown in FIG. 3, portions of the media conveying path adjacent to the imaging surface 14 are substantially circular, which has been seen to adversely affect the smooth transfer of media sheet to the media collecting section 20 and lead to paper jams and motion shocks in the media conveying path.

SUMMARY OF THE INVENTION

Exemplary embodiments of the present invention overcome the shortcomings of prior ADFs and thereby satisfy a significant need for an improved ADF having reduced occurrences of paper jams and motion shocks. According to an exemplary embodiment, an imaging apparatus includes an ADF having a media feeding section, a media collecting section and a media conveying path extending from the media feeding section to the media collecting section. The imaging apparatus includes a first scan head adjacent to the ADF. The first scan head is moveable to a raised position aligned with a first portion of the media conveying path for scanning a media sheet in the first portion of the media conveying path.

The imaging apparatus includes a second portion of the media conveying path disposed downstream from the first portion of the media conveying path and upstream from the media collecting section. In some embodiments, the first scan head is moveable from a first position where the first portion of the media conveying path is not coplanar with the second portion of the media conveying path to the raised position to cause the first portion of the media conveying path to be substantially coplanar with the second portion of the media conveying path.

The imaging apparatus also includes a first housing attached to a second housing. The ADF is disposed within the first housing. The first scan head is disposed within the second housing. A portion of the first scan head extends above a top surface of the second housing when the first scan head is in the raised position. Embodiments include those wherein the first scan head is in an inclined position with respect to the top surface of the second housing when the first scan head is in the raised position.

The imaging apparatus includes a first imaging surface disposed along the top surface of the second housing. The first imaging surface is selectably coupled to the first scan head and moveable to a raised position when the first scan head is in the raised position. In some embodiments, the imaging apparatus also includes a pressure pad in the first housing for pressing a media sheet against the first imaging surface. The pressure pad is moveable with the first imaging surface and the first scan head.

Embodiments include those wherein the imaging apparatus includes an obstruction member disposed in the second housing for engaging the first scan head and moving the first scan head to the raised position. A second imaging surface is disposed along the top surface of the second housing. The first scan head is slidably disposed on a guide rail for bi-directionally moving the first scan head below the first imaging surface and the second imaging surface. In some embodiments, a lower member extends from the first scan head for engaging the obstruction member and the obstruction member is a ramp. When the first scan head is moved along the guide rail toward the first imaging surface, the lower member engages and ascends the ramp causing the first scan head to move to the raised position causing the first imaging surface to move to the raised position.

Alternatives include those wherein the obstruction member is a cam rotatably mounted on a cam shaft for rotating the cam to engage with and cause the first scan head to move to the raised position to cause the first imaging surface to move to the raised position.

In some embodiments, the imaging apparatus includes a second scan head in the first housing for scanning the second side of the media sheet. The media conveying path is substantially planar from a point upstream from the first scan head to a point adjacent to a portion of the second scan head when the first scan head is in the raised position.

BRIEF DESCRIPTION OF THE DRAWINGS

The above-mentioned and other features and advantages of the various embodiments of the invention, and the manner of attaining them, will become more apparent and the invention will be better understood by reference to the following description of embodiments of the invention taken in conjunction with the accompanying drawings, wherein.

DETAILED DESCRIPTION

Figure 1:
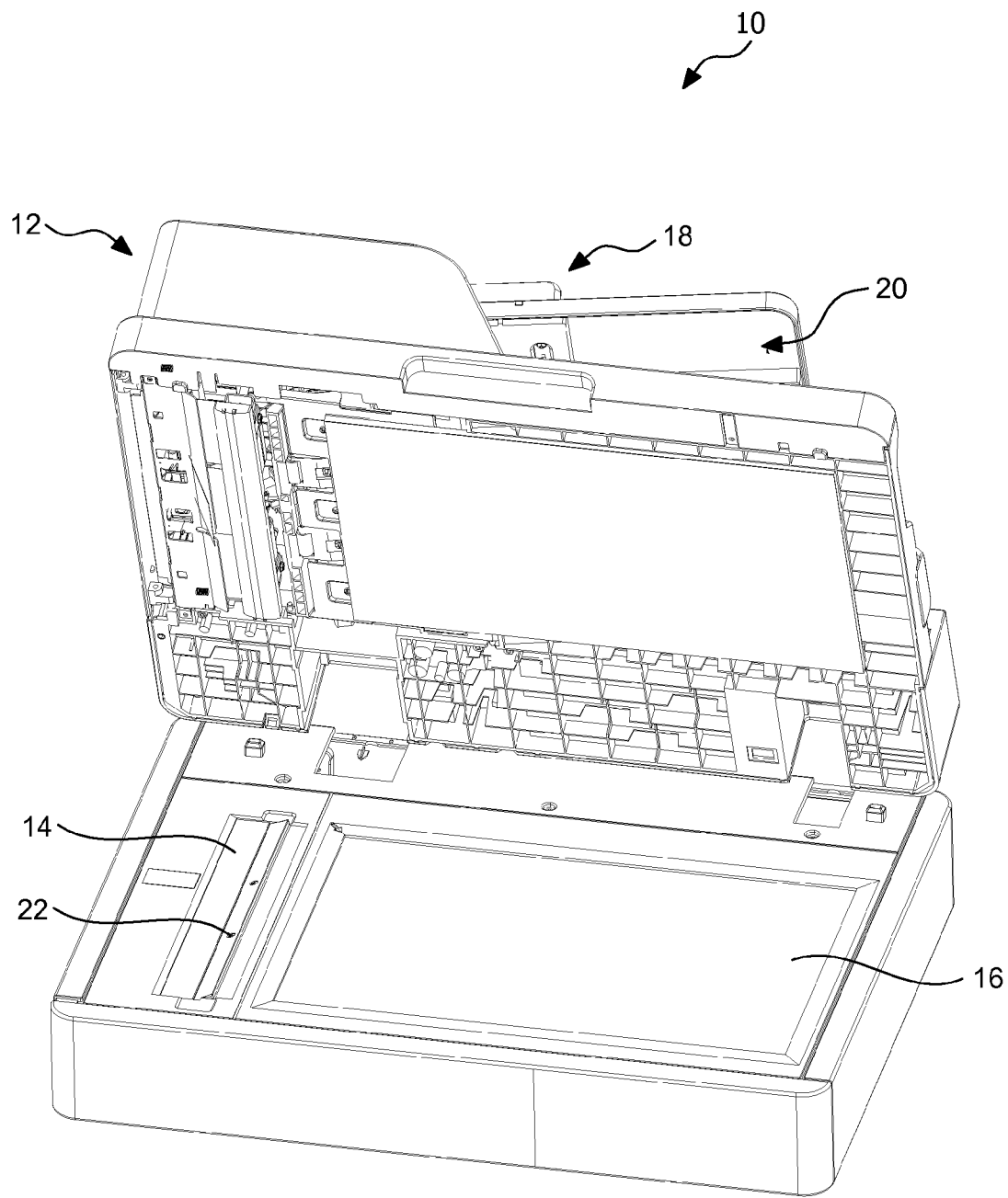
FIG. 1 is a perspective view of an existing imaging apparatus.
Figure 2:
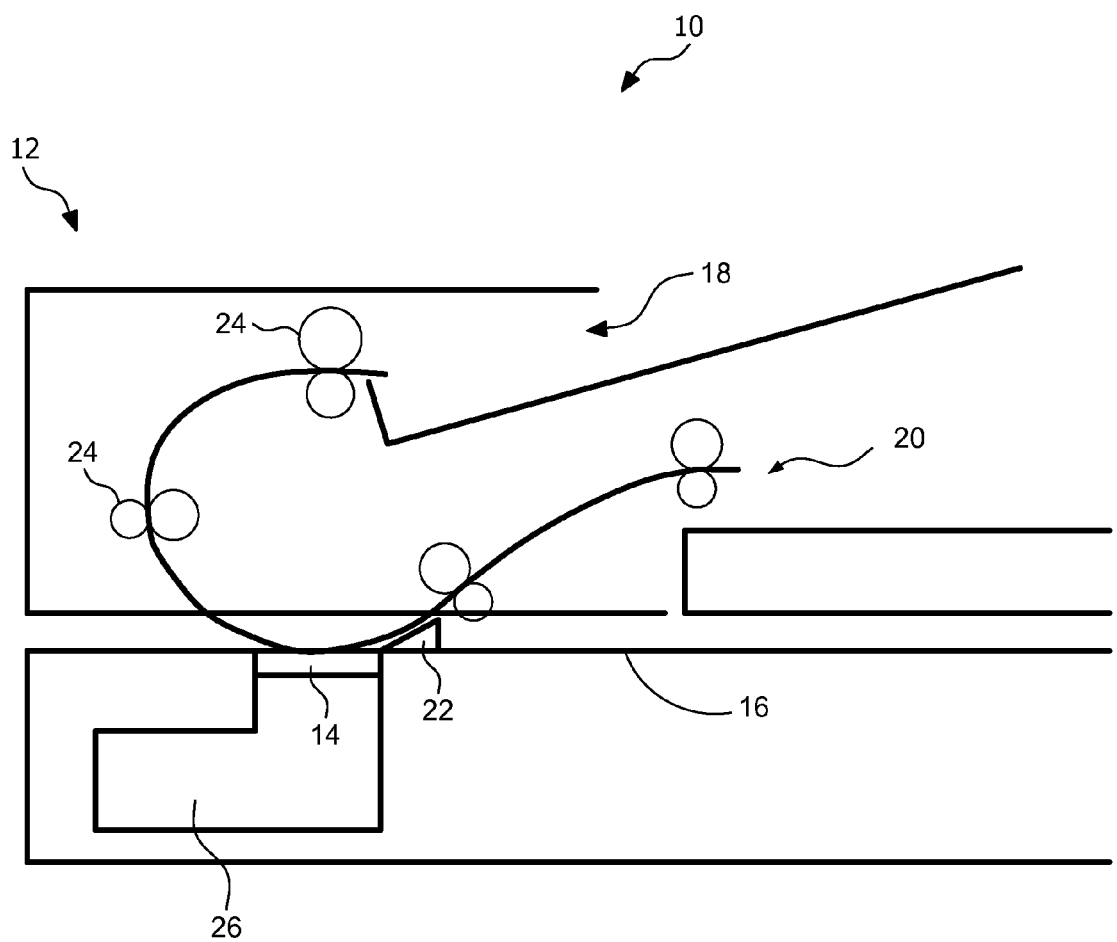
FIG. 2 is a schematic view of a media conveying path in an ADF of the imaging apparatus of FIG. 1.
Figure 3:
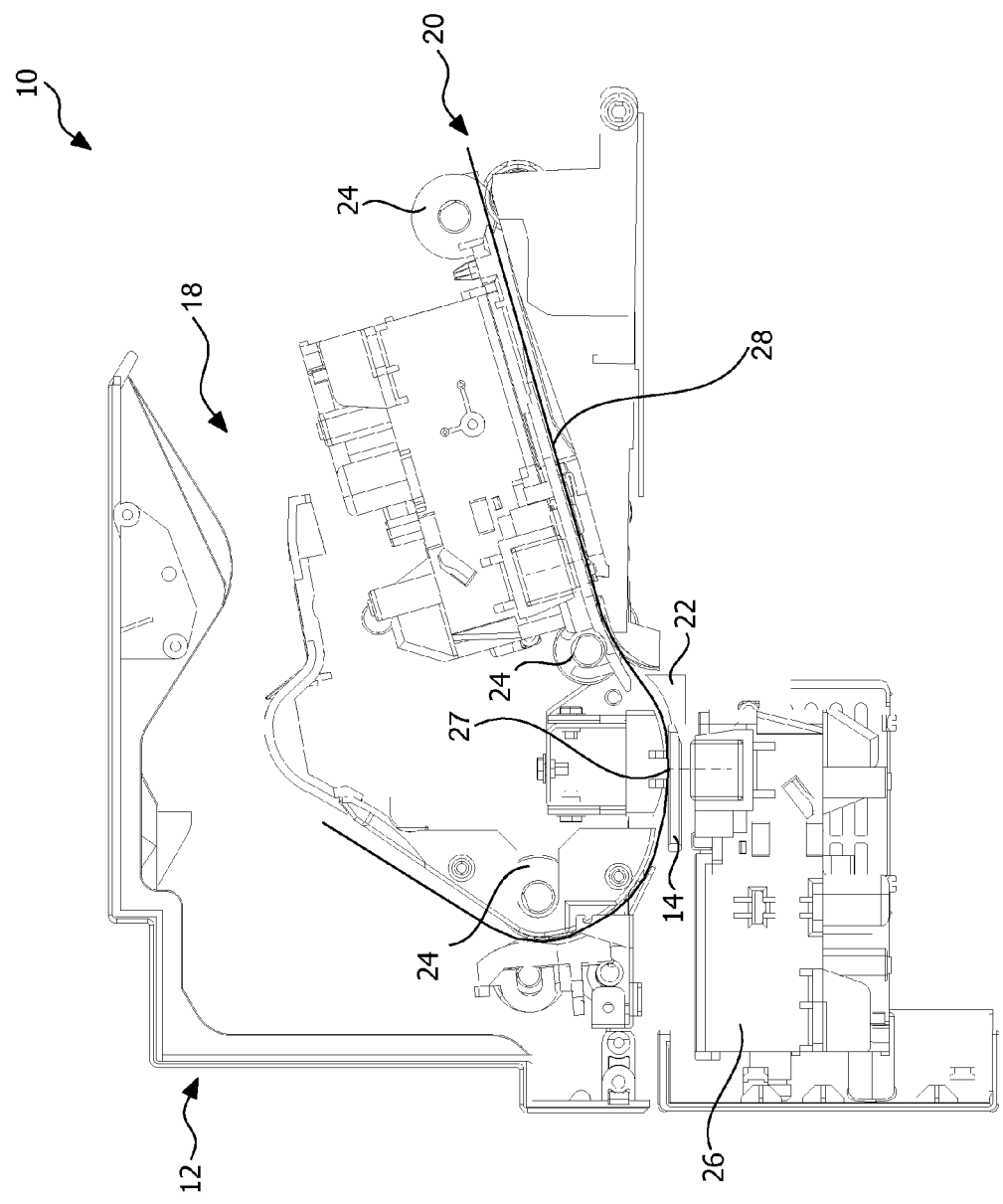
FIG. 3 is a front elevation view of the imaging apparatus of FIG. 1.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. Reference will now be made in detail to the exemplary embodiment(s) of the invention as illustrated in the accompanying drawings. Whenever possible, the same reference numerals will be used throughout the drawings to refer to the same or like parts.

Figure 4:
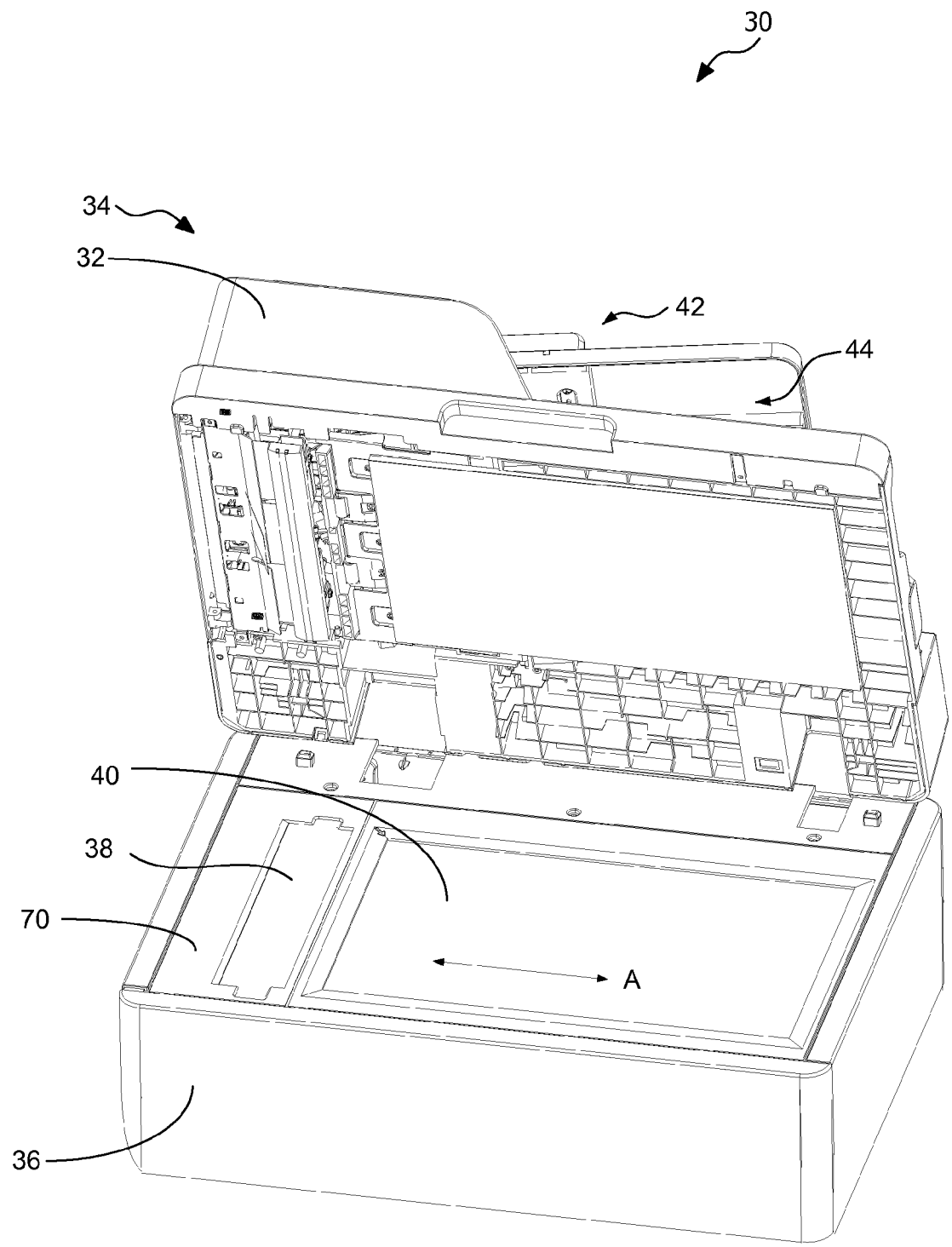
FIG. 4 is a perspective view of an imaging apparatus according to one embodiment of the present invention.

FIG. 4 is a perspective view of an imaging apparatus 30 according to an exemplary embodiment of the present invention that is configured to operate in ADF mode and manual mode. The imaging apparatus 30 includes a housing 32 having ADF 34 and a housing 36 having a scan head 52 (see FIG. 5), an imaging surface 38, and an imaging surface 40. Imaging surface 38 and imaging surface 40 are disposed along a top surface 70 of the housing 36. The ADF 34 includes a media feeding section 42 for feeding the media sheet to the imaging apparatus 30 for scanning, a media collecting section 44 for collecting the scanned media sheet, and a media conveying path 48 (see FIG. 5) for transferring a media sheet from the media feeding section 42 through the ADF 34 for scanning and then to the media collecting section 44.

Housing 32 is pivotably attached to housing 36 in order to allow housing 32 to be manually opened and closed against housing 36. To scan a media sheet in manual mode, housing 32 is manually lifted to expose imaging surface 40. The media sheet is placed on top of imaging surface 40. Housing 32 is then manually closed against housing 36. Once scanning is initiated, the scan head 52 moves bi-directionally below the imaging surface 40 along a major axis (shown by an arrow A) to scan the media sheet. Following the completion of scanning, housing 32 is manually lifted to remove the scanned media sheet and a next media sheet is placed over the imaging surface 40 for scanning. Housing 32 is then closed over housing 36 in order to permit scanning of the next media sheet.

Figure 5:
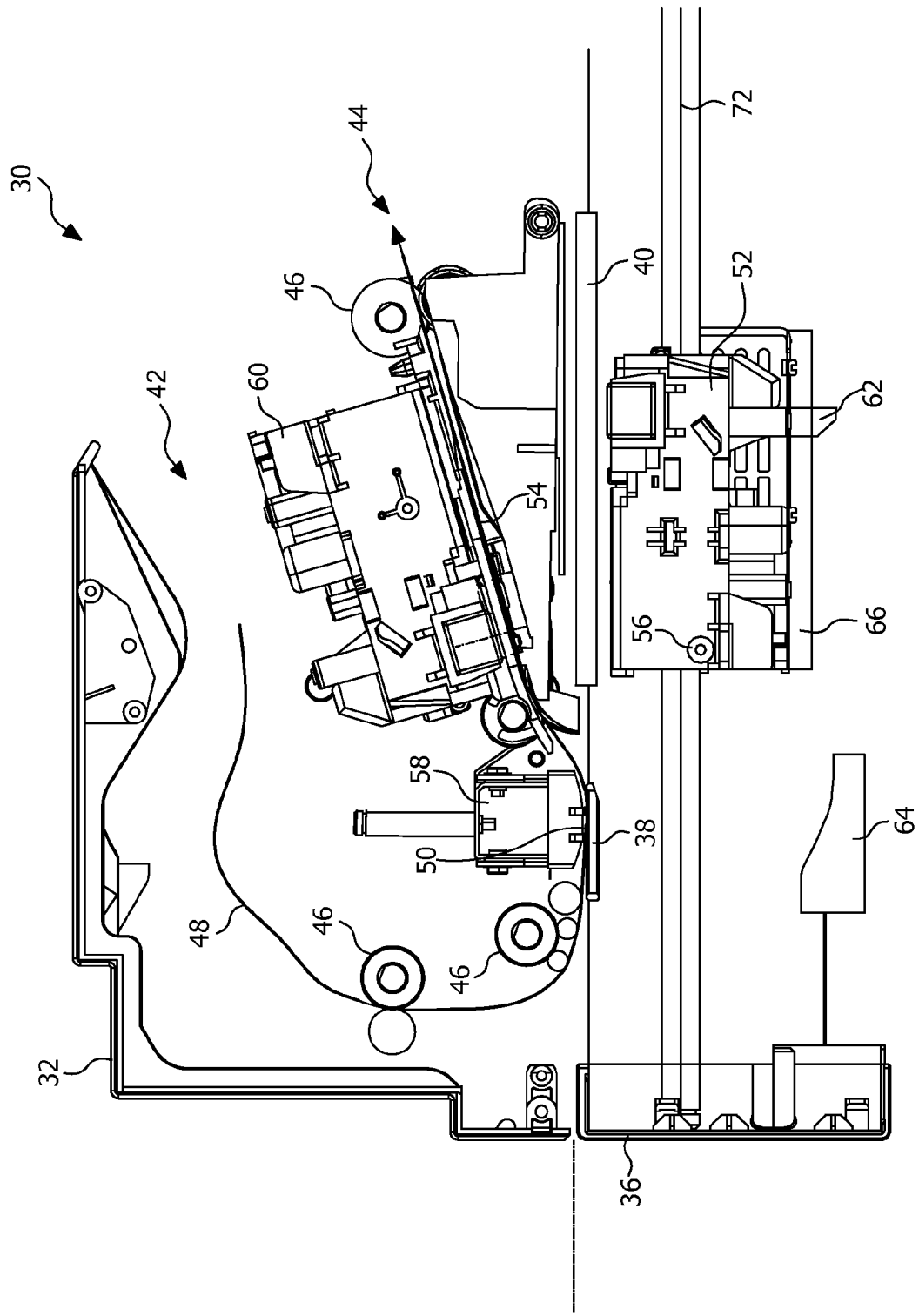
FIG. 5 is a front elevation view of an imaging apparatus according to one embodiment of the present invention configured for scanning in manual mode.

When the imaging apparatus 30 operates in ADF mode, opening and closing housing 32 against housing 36 is not required because each media sheet is automatically fed through media conveying path 48 (see FIG. 5). A media sheet, or a stack of media sheets, is placed in the media feeding section 42. Each media sheet is automatically fed into the media conveying path 48. As the media sheet passes through the media conveying path 48, the media sheet passes over imaging surface 38 where it is scanned. The media sheet then moves to the media collecting section 44.

FIG. 5 illustrates the internal components of the imaging apparatus 30 and shows a plurality of conveyors 46 for transferring the media sheet along media conveying path 48. The media conveying path 48 extends between the media feeding section 42 and the media collecting section 44. When the imaging apparatus 30 is in manual mode, the scan head 52 is located within housing 36. The scan head 52 is slidably disposed on guide rail 72 for bi-directionally moving the scan head 52 below imaging surface 38 and imaging surface 40 to permit scanning a media sheet placed on imaging surface 40. In manual mode, a portion 50 of the media conveying path 48 positioned over imaging surface 38 is not coplanar with a portion 54 of the media conveying path 48 located downstream from portion 50 and upstream from media collecting section 44. In manual mode, this offset does not affect scanning because the media sheet does not travel along the media conveying path 48.

Figure 6:
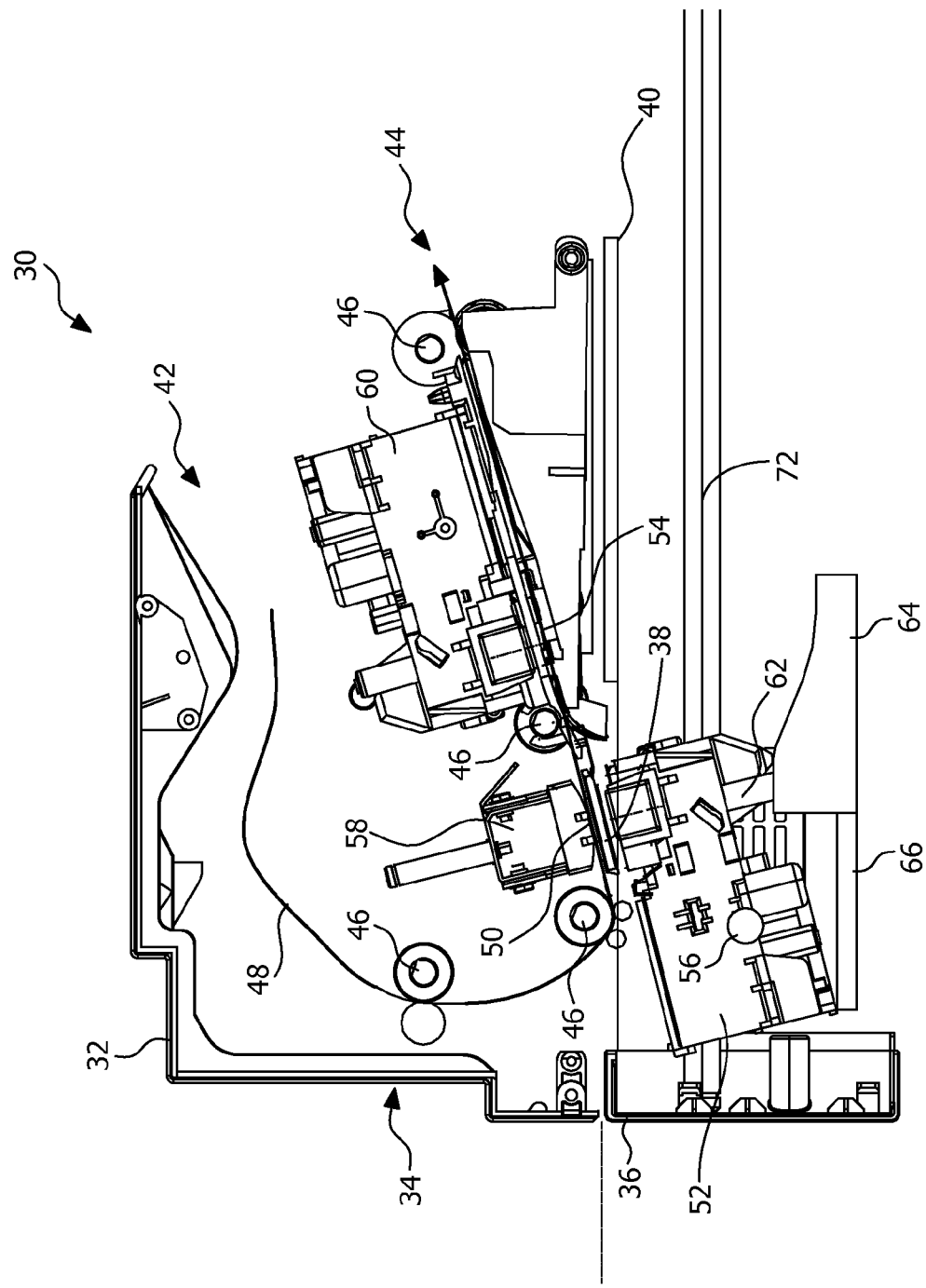
FIG. 6 is a front elevation view of an imaging apparatus according to one embodiment of the present invention configured for scanning in ADF mode.

FIG. 6 illustrates scanning in ADF mode. When scanning in ADF mode, the scan head 52 remains in a generally fixed position beneath imaging surface 38. The media sheet is scanned as it passes through portion 50 of the media conveying path 48 positioned over imaging surface 38. After scanning portion 50 of the media conveying path 48, the media sheet is moved through portion 54 of the media conveying path toward media collecting section 44. As shown in FIG. 6, the scan head 52 is movable to a raised position aligned with portion 50 of the media conveying path 48 for scanning a media sheet in portion 50 of the media conveying path 48. Imaging surface 38 is selectably coupled to the scan head 52 and moveable to a raised position when the scan head 52 is in the raised position. When the scan head 52 is in the raised position, portion 50 of the media conveying path 48 is substantially coplanar with portion 54 thereof. This planarity eliminates the need for an ADF ramp and reduces the likelihood of a paper jam as the media sheet passes through the media conveying path 48. When the scan head 52 is in the raised position, a portion of the scan head 52 extends above a top surface 70 of the housing 36 and the scan head 52 is in an inclined position with respect to the top surface 70 of the housing 36. In some embodiments, the scan head 52 pivots about a pivot point or pivot axis 56 to attain the raised position.

The ADF 34 further includes a pressure pad 58 that presses the media sheet against the imaging surface 38. The pressure pad 58 is movable with imaging surface 38 and the scan head 52. Imaging apparatus 30 may also include a second scan head 60 for scanning the reverse side of the media sheet where duplex scanning is desired. The second scan head 60 is positioned above the media conveying path 48. Embodiments include those wherein the second scan head 60 is downstream from portion 50 of the media conveying path. When the scan head 52 is in the raised position, the media conveying path 48 is substantially planar from a point upstream from portion 50 to a portion adjacent second scan head 60.

The housing 36 may include an obstruction member 64 for engaging the scan head 52 and moving the scan head 52 to and from the raised position. In some embodiments, the scan head 52 includes a lower member 62 extending outwardly from the scan head 52 for engaging the obstruction member 64. In some embodiments, the obstruction member 64 is a ramp as shown in FIG. 6. As the scan head 52 travels along the guide rail 72 toward the imaging surface 38, the lower member 62 engages and ascends the ramp causing the scan head 52 to move to the raised position and causing the imaging surface 38 to also move to the raised position.

Figure 7:
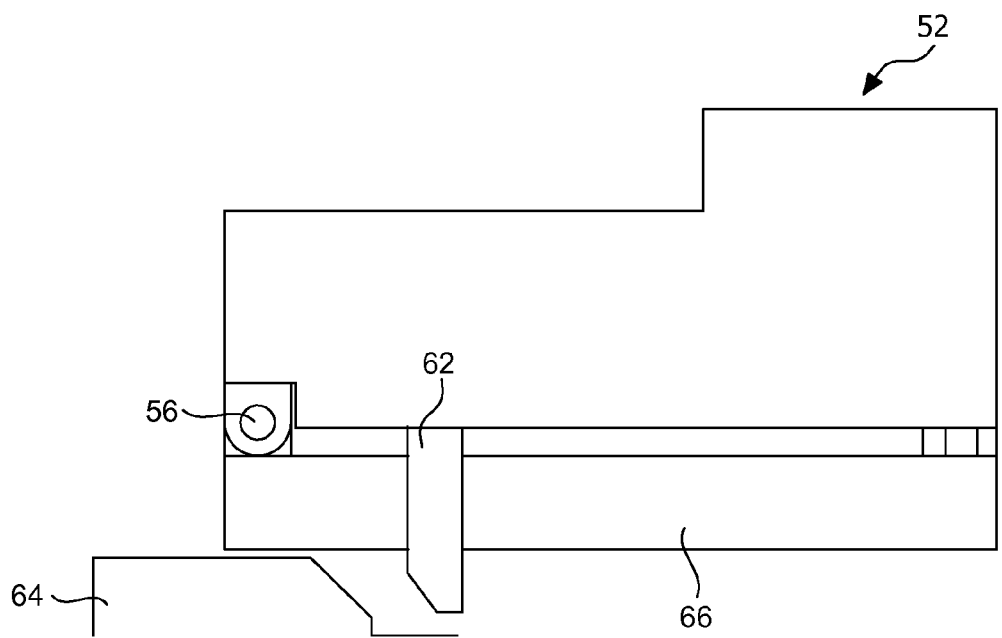
FIG. 7 is a front elevation view of a scan head according to one embodiment of the present invention.
Figure 8:
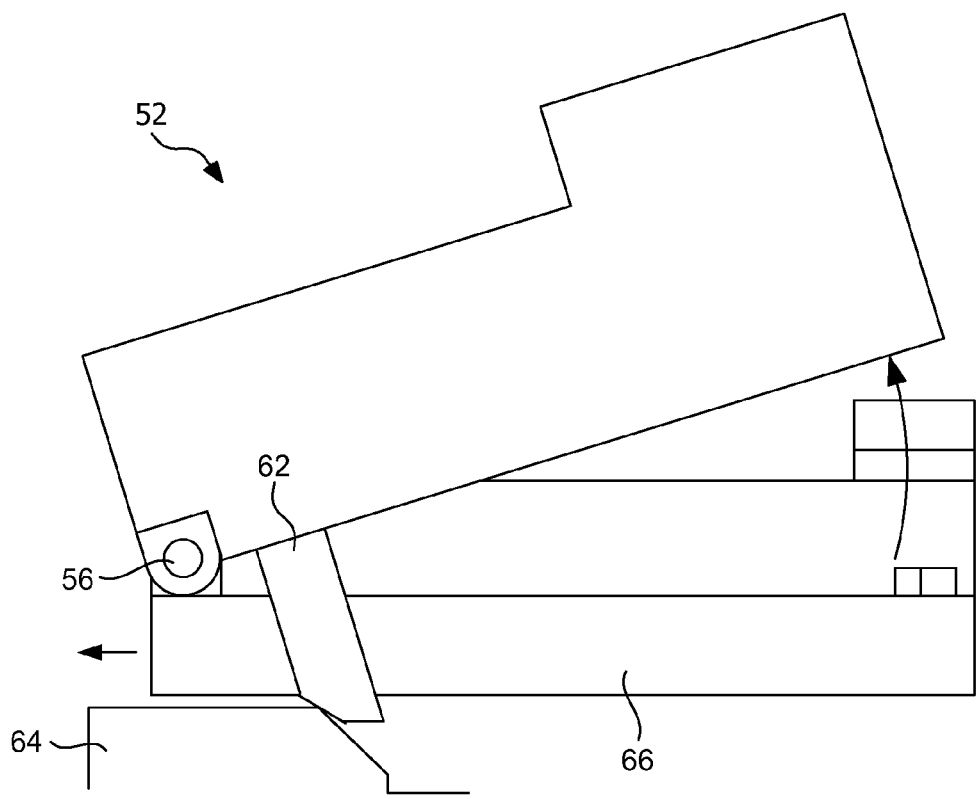
FIG. 8 is a front elevation view of a scan head according to one embodiment of the present invention in a raised position.

FIG. 7 is a simplified side elevation view of the scan head 52 with the lower member 62 disengaged from the obstruction member 64, in accordance with an exemplary embodiment of the present invention. FIG. 7 shows that while disengaged from the obstruction member 64, the scan head 52 is not separated from a base 66 on which scan head 52 rests. However, as shown in FIG. 8, when the lower member 62 engages with the obstruction member 64, the scan head 52 is separated from the base 66 and moved to the raised position in part by pivoting about pivot point or pivot axis 56.

Figure 9:
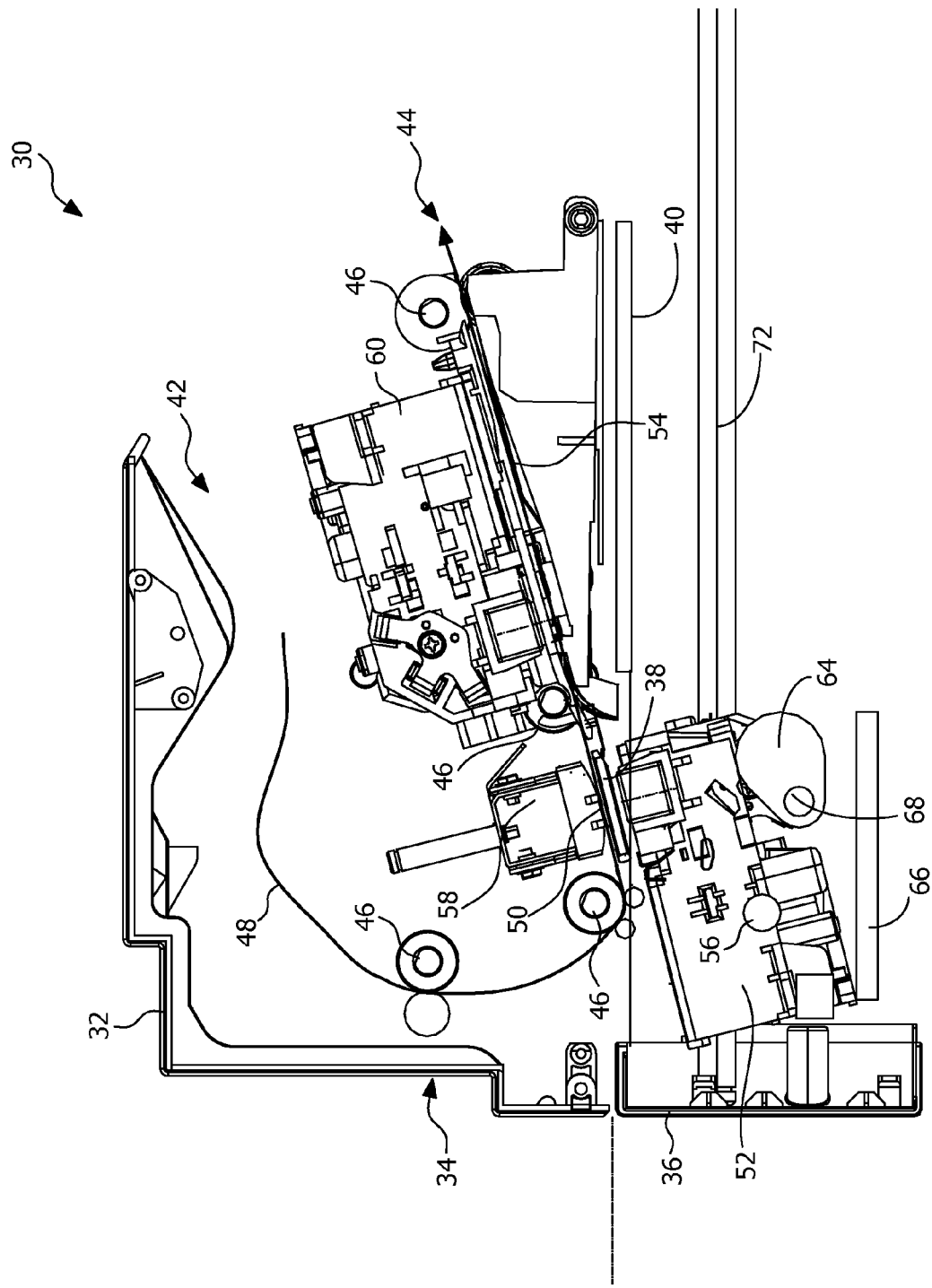
FIG. 9 is a front elevation view of an imaging apparatus according to an alternative embodiment of the present invention configured for scanning in ADF mode.

With reference to FIG. 9, in another embodiment, the obstruction member 64 is a cam. The cam is rotatably mounted on a cam shaft 68 for rotating the cam to engage with and cause the scan head 52 to move to the raised position to cause the imaging surface 38 to move to the raised position. The cam shaft 68 may be driven by a motor, a solenoid (not shown) or any other suitable driving mechanism known in the art. Moving the imaging surface 38 to the raised position aligns portion 50 of the media conveying path 48 with portion 54. The foregoing description includes exemplary embodiments which utilize an obstruction member in the form of a ramp that is engaged by a lower member 62 and a rotatable cam used to move the scan head 52 to the raised position; however, any mechanism for moving the scan head 52 to the raised position deemed suitable by a user may be used.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An imaging apparatus comprising:
an automatic document feeder having a media feeding section, a media collecting section and a media conveying path extending from the media feeding section to the media collecting section;
a first scan head adjacent to the automatic document feeder and moveable to a raised position aligned with a first portion of the media conveying path for scanning a media sheet in the first portion of the media conveying path; and
a first housing attached to a second housing, wherein the automatic document feeder is disposed within the first housing, the first scan head is disposed within the second housing and a portion of the first scan head extends above a top surface of the second housing when the first scan head is in the raised position.

2. The imaging apparatus of claim 1, further comprising a first imaging surface disposed along the top surface of the second housing selectably coupled to the first scan head and moveable to a raised position when the first scan head is in the raised position.

3. The imaging apparatus of claim 2, further comprising a pressure pad in the first housing for pressing a media sheet against the first imaging surface and moveable with the first imaging surface and the first scan head.

4. The imaging apparatus of claim 1, further comprising an obstruction member disposed in the second housing for engaging the first scan head and moving the first scan head to the raised position.

5. The imaging apparatus of claim 4, further comprising a lower member extending from the first scan head for engaging the obstruction member.

6. The imaging apparatus of claim 5, further comprising:
a first imaging surface disposed along the top surface of the second housing selectably coupled to the first scan head and moveable to a raised position when the first scan head is in the raised position;
a second imaging surface disposed along the top surface of the second housing; and
a guide rail within the second housing, the first scan head being slidably disposed on the guide rail for bi-directionally moving the first scan head below the first imaging surface and the second imaging surface;
wherein the obstruction member is a ramp and when the first scan head is moved along the guide rail toward the first imaging surface, the lower member engages and ascends the ramp causing the first scan head to move to the raised position causing the first imaging surface to move to the raised position.

7. The imaging apparatus of claim 4, further comprising a first imaging surface disposed along the top surface of the second housing selectably coupled to the first scan head and moveable to a raised position when the first scan head is in the raised position, wherein the obstruction member is a cam rotatably mounted on a cam shaft for rotating the cam to engage with and cause the first scan head to move to the raised position to cause the first imaging surface to move to the raised position.

8. The imaging apparatus of claim 1, further comprising the first scan head for scanning a first side of a media sheet and a second scan head in the first housing for scanning the second side of the media sheet, wherein the media conveying path is substantially planar from a point upstream from the first scan head to a point adjacent to a portion of the second scan head when the first scan head is in the raised position.

9. The imaging apparatus of claim 1, wherein the first scan head is in an inclined position with respect to the top surface of the second housing when the first scan head is in the raised position.

10. An imaging apparatus comprising:
a first housing attached to a second housing;
the first housing having an automatic document feeder having a media feeding section, a media collecting section, a media conveying path extending from the media feeding section to the media collecting section, the media conveying path having a first portion and a second portion, the second portion being disposed downstream from the first portion and upstream from the media collecting section; and the second housing having a first scan head adjacent to the automatic document feeder and moveable from a first position where the first portion of the media conveying path is not coplanar with the second portion of the media conveying path to a raised position to cause the first portion of the media conveying path to be substantially coplanar with the second portion of the media conveying path, wherein a portion of the first scan head extends above a top surface of the second housing when the first scan head is in the raised position.

11. The imaging apparatus of claim 10, further comprising a first imaging surface disposed along the top surface of the second housing selectably coupled to the first scan head and moveable to a raised position when the first scan head is in the raised position.

12. The imaging apparatus of claim 11, further comprising a pressure pad in the first housing for pressing a media sheet against the first imaging surface and moveable with the first imaging surface and the first scan head.

13. The imaging apparatus of claim 10, further comprising an obstruction member disposed in the second housing for engaging the first scan head and moving the first scan head to the raised position.

14. The imaging apparatus of claim 13, further comprising a lower member extending from the first scan head for engaging the obstruction member.

15. The imaging apparatus of claim 14, further comprising:
a first imaging surface disposed along the top surface of the second housing selectably coupled to the first scan head and moveable to a raised position when the first scan head is in the raised position;
a second imaging surface disposed along the top surface of the second housing; and
a guide rail within the second housing, the first scan head being slidably disposed on the guide rail for bi-directionally moving the first scan head below the first imaging surface and the second imaging surface;
wherein the obstruction member is a ramp and when the first scan head is moved along the guide rail toward the first imaging surface, the lower member engages and ascends the ramp causing the first scan head to move to the raised position causing the first imaging surface to move to the raised position.

16. The imaging apparatus of claim 13, further comprising a first imaging surface disposed along the top surface of the second housing selectably coupled to the first scan head and moveable to a raised position when the first scan head is in the raised position, wherein the obstruction member is a cam rotatably mounted on a cam shaft for rotating the cam to engage with and cause the first scan head to move to the raised position to cause the first imaging surface to move to the raised position.

17. The imaging apparatus of claim 10, further comprising the first scan head for scanning a first side of a media sheet and a second scan head in the first housing for scanning a second side of the media sheet, wherein the media conveying path is substantially planar from a point upstream from the first scan head to a point adjacent to a portion of the second scan head when the first scan head is in the raised position.

18. The imaging apparatus of claim 10, wherein the first scan head is in an inclined position with respect to the top surface of the second housing when the first scan head is in the raised position.

19. An imaging apparatus comprising:
an automatic document feeder having a media feeding section, a media collecting section and a media conveying path extending from the media feeding section to the media collecting section;
a first scan head adjacent to the automatic document feeder and moveable to a raised position aligned with a first portion of the media conveying path for scanning a media sheet in the first portion of the media conveying path; and
a second portion of the media conveying path disposed downstream from the first portion of the media conveying path and upstream from the media collecting section;
wherein the first scan head is moveable from a first position where the first portion of the media conveying path is not coplanar with the second portion of the media conveying path to the raised position to cause the first portion of the media conveying path to be substantially coplanar with the second portion of the media conveying path.

* * * * *